UNITED STATES PATENT OFFICE.

HEINRICH WILHELM KASTEN, OF HANOVER, PRUSSIA, GERMANY.

PROCESS OF MANUFACTURING BRICKS.

SPECIFICATION forming part of Letters Patent No. 370,948, dated October 4, 1887.

Application filed April 25, 1887. Serial No. 236,063. (No specimens.)

*To all whom it may concern:*

Be it known that I, HEINRICH WILHELM KASTEN, of the town of Hanover, Prussia, Germany, have invented certain new and useful Improvements in the Manufacture of Bricks, Tiles, and all kinds of Earthenware, of which I declare the following to be a description.

My invention relates to improvements in the manufacture of bricks, tiles, and all kinds of earthenware; and it consists, chiefly, in treating clay and other raw materials for making bricks, tiles, and other ware.

This process enables the goods to be burned in wet condition, without the said treatment in any way prejudicing the burning of the same in dry condition. According to my invention the customary raw materials are mixed with salts before the forming and burning. The salts specially suited for employment in my said process are chlorate of soda, chlorate of potash, and, further, the sulphuric, carbonic, and nitric salts of the alkalies or the pure oxides of the same. The mixing of the raw materials with such salts is carried out either by saturating the said raw material with an aqueous solution of the salts or mixing the wet or dry materials with the salts in powdered or natural granular form. This mixture of clay and salts is formed and either burned direct in wet condition or previously air-dried. During the burning process the water which is mixed with the raw material is converted into hydrogen and oxygen at a comparatively-low temperature in consequence of the presence of the alkali in the same. The hydrogen is either burned, thus producing a considerable saving in fuel, as the temperature is considerably increased, (as is the case with a smithy-fire,) or it forms a compound with the chlorine of the chlorate of the alkalies and escapes as muriatic-acid vapors. The oxygen combines with the metallic alkalies to form oxides of alkali, which act as smelting medium.

If the mixture of the raw materials with the salts is effected in a wet condition—as, for instance, in making bricks which are formed in hand-molds—the bricks, &c., will be burned in a remarkably short time, much easier, and the form will be retained much better than with the customary process. In consequence of the moisture in the same—that is, the decomposition of the water into hydrogen and the oxide of alkali formed by the absorbed oxygen—the process is facilitated; but even when the materials are mixed dry with the powdered or natural salts and subjected to high pressure the same advantages are attained, as a fritting takes place in comparatively short time, although weaker than when water or steam is present. The water mixed with the clay, and also the water in the salt crystals, and especially in salts crystallized out of the saline solutions, becomes free at about 300° centigrade, is decomposed by the heat in burning, and the hydrogen and oxygen utilized in the manner before described. The mixture of the salts and the process ensuing during the burning cause a readier solution of the silicic acid and facilitate the operation of burning.

Experiments have shown that when simple quartz sand moistened with a saturated solution of salt is subjected to the heat of a common stove the silica in the sand will be converted into soluble silicic acid.

In manufacturing bricks according to my process the fritting will ensue so readily that no alteration of the form will occur and any lime that may be present will be prevented from causing any disadvantageous effect, as the same, as well as the silicic clay or silica, is converted into a compound entirely insoluble in water.

Firm well-burned weather-proof goods can be produced according to this process, even from the worst kind of raw material, in much shorter time than heretofore.

By mixing the raw materials with salts artificial porcelain-clay can be produced.

Having now particularly described and ascertained the nature of my said invention and in what manner the same is to be performed, I declare that what I claim, and desire to secure by Letters Patent, is—

1. The herein-described improvement in the manufacture of articles from clay, such as bricks, pottery, &c., which consists in mixing with the clay, before forming the articles therefrom, salts of the alkalies in the manner set forth, then forming the articles therefrom, and then burning said articles.

2. The herein-described improvement in the manufacture of articles from clay, such as bricks, pottery, &c., which consists in first mixing with the wet clay salts of the alkalies, as set forth, then molding the articles therefrom, and then burning the said articles directly while in the wet state.

In witness whereof I have hereunto signed my name in the presence of two subscribing witnesses.

HEINRICH WILHELM KASTEN.

Witnesses:
C. LÜTTGE,
JOHS. KRACKE.